March 3, 1964     S. W. STEVENS     3,123,202
SLATTED-TYPE CONVEYOR
Filed July 2, 1959     5 Sheets-Sheet 1
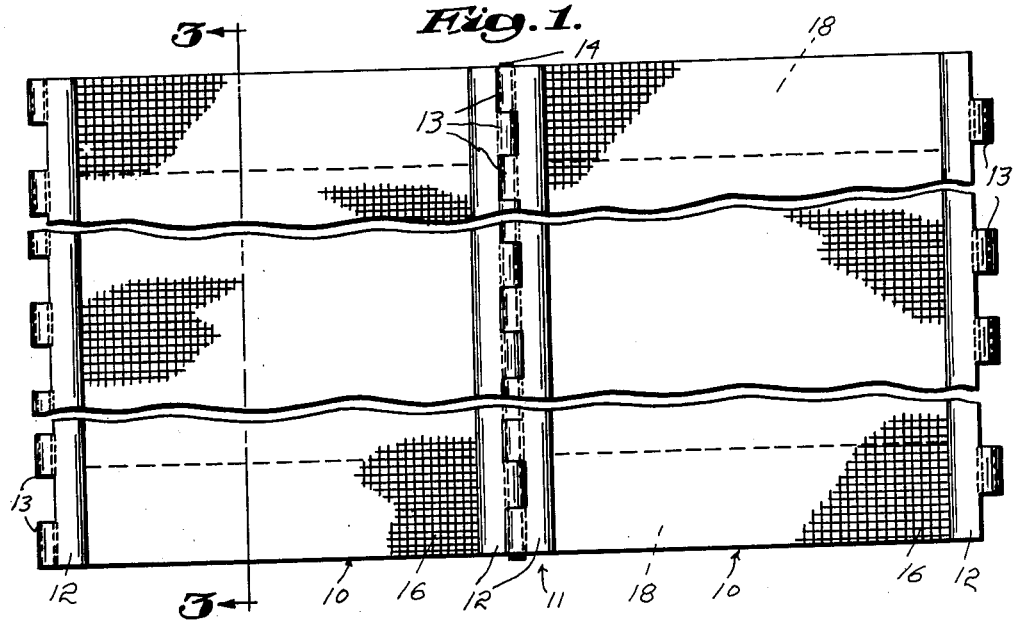
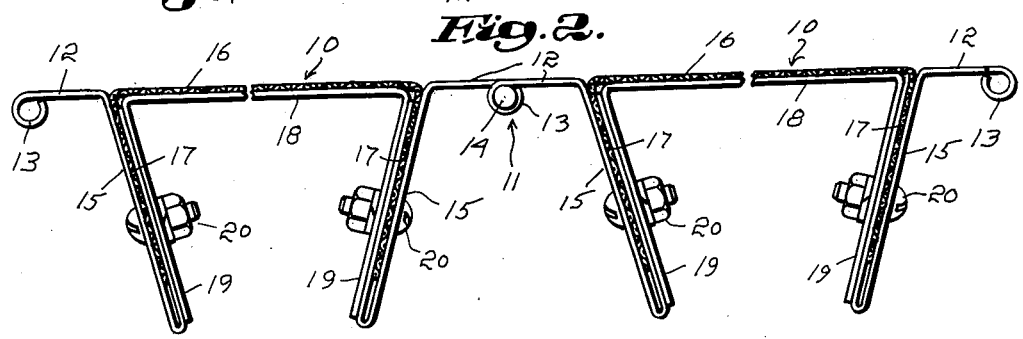
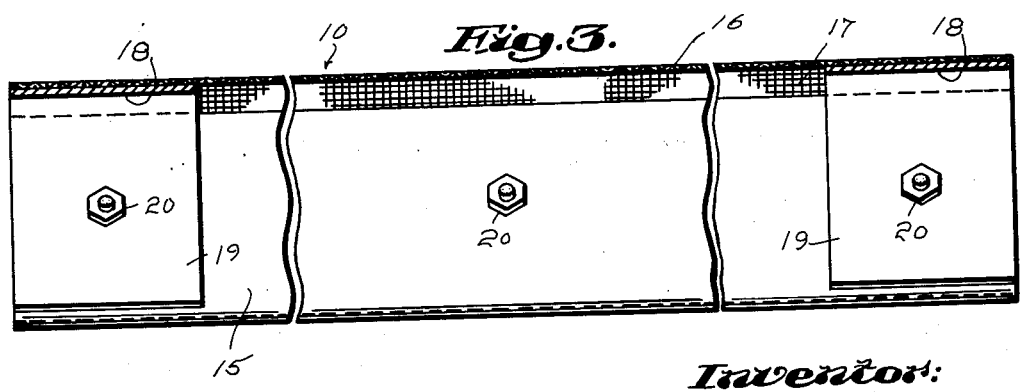
Inventor:
Samuel Weldon Stevens
by Abbott Spear
Attorney

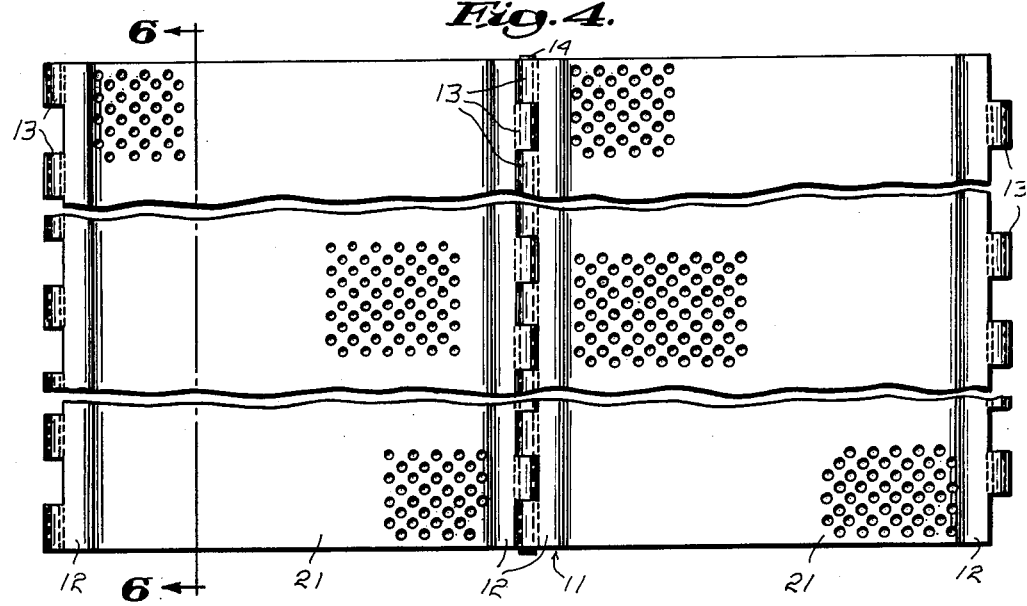
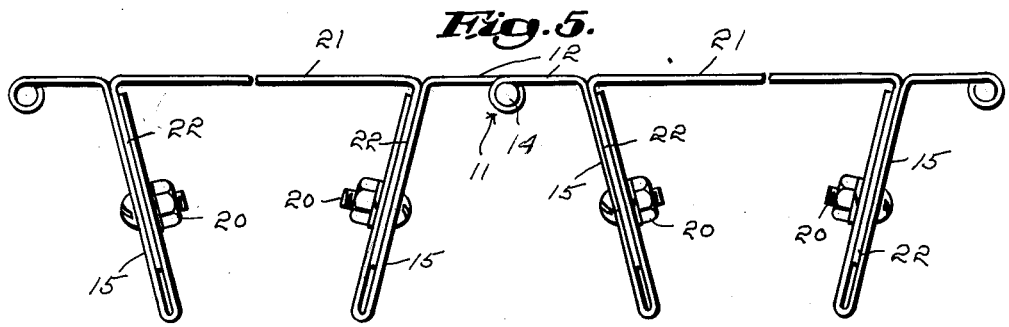
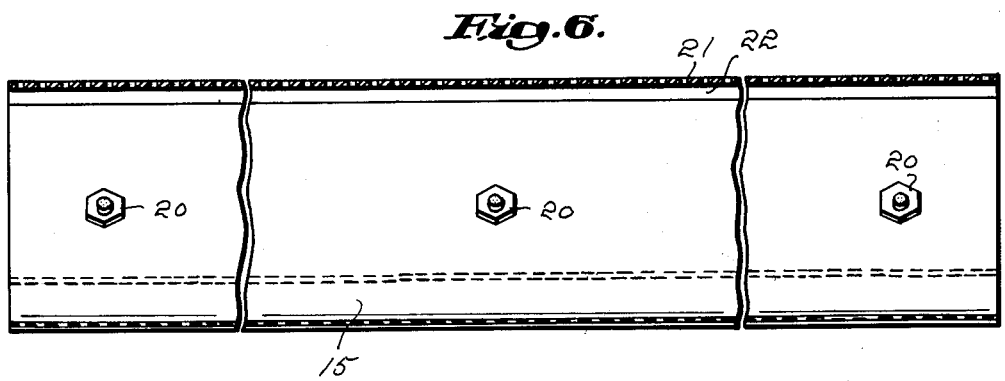

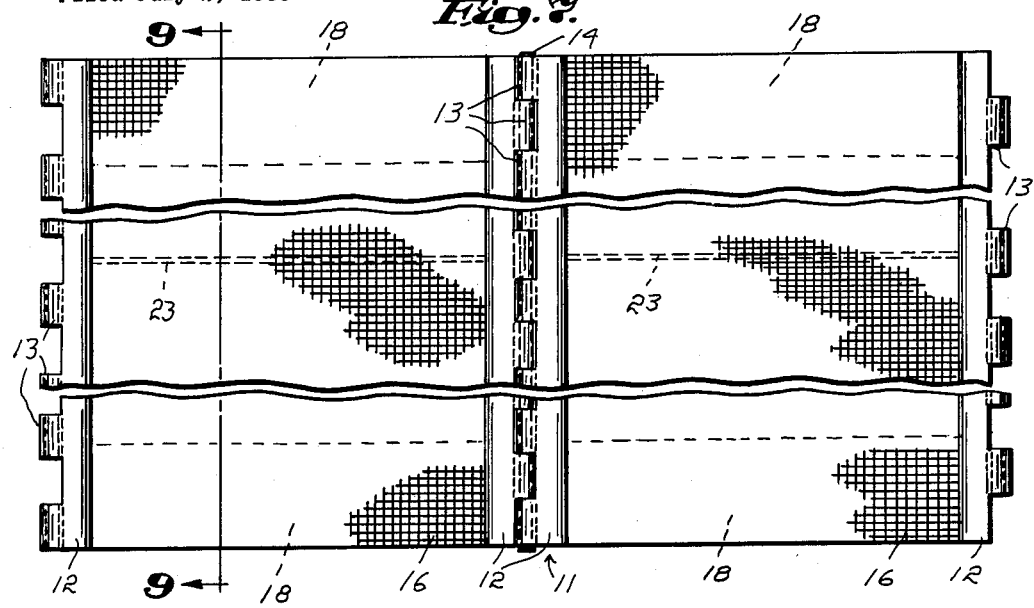
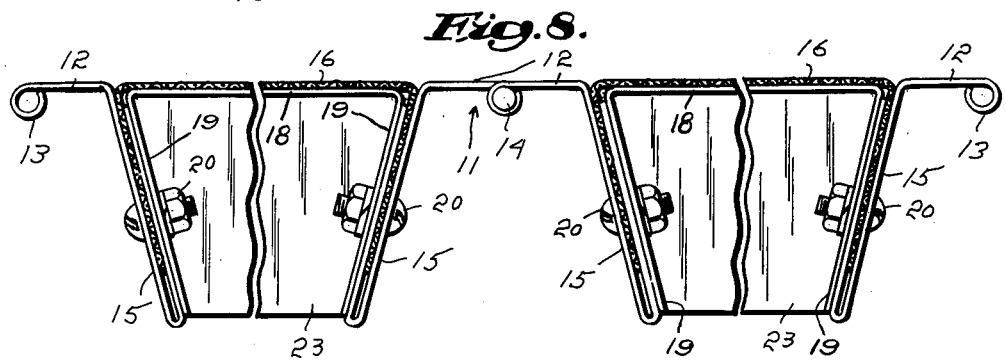
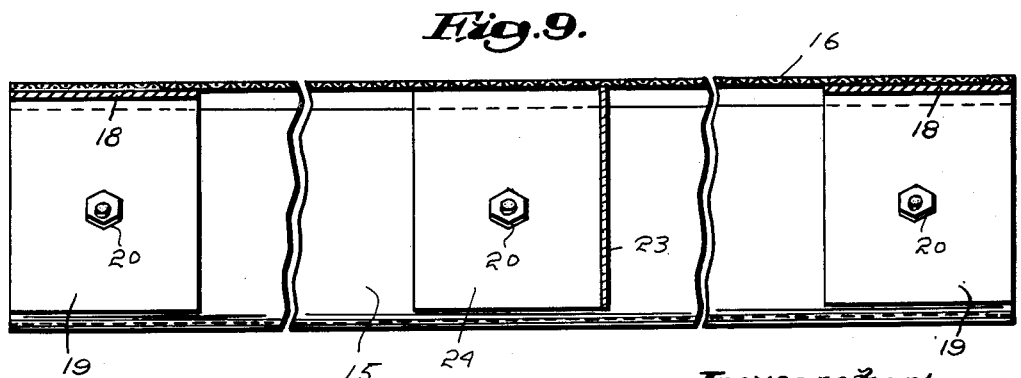

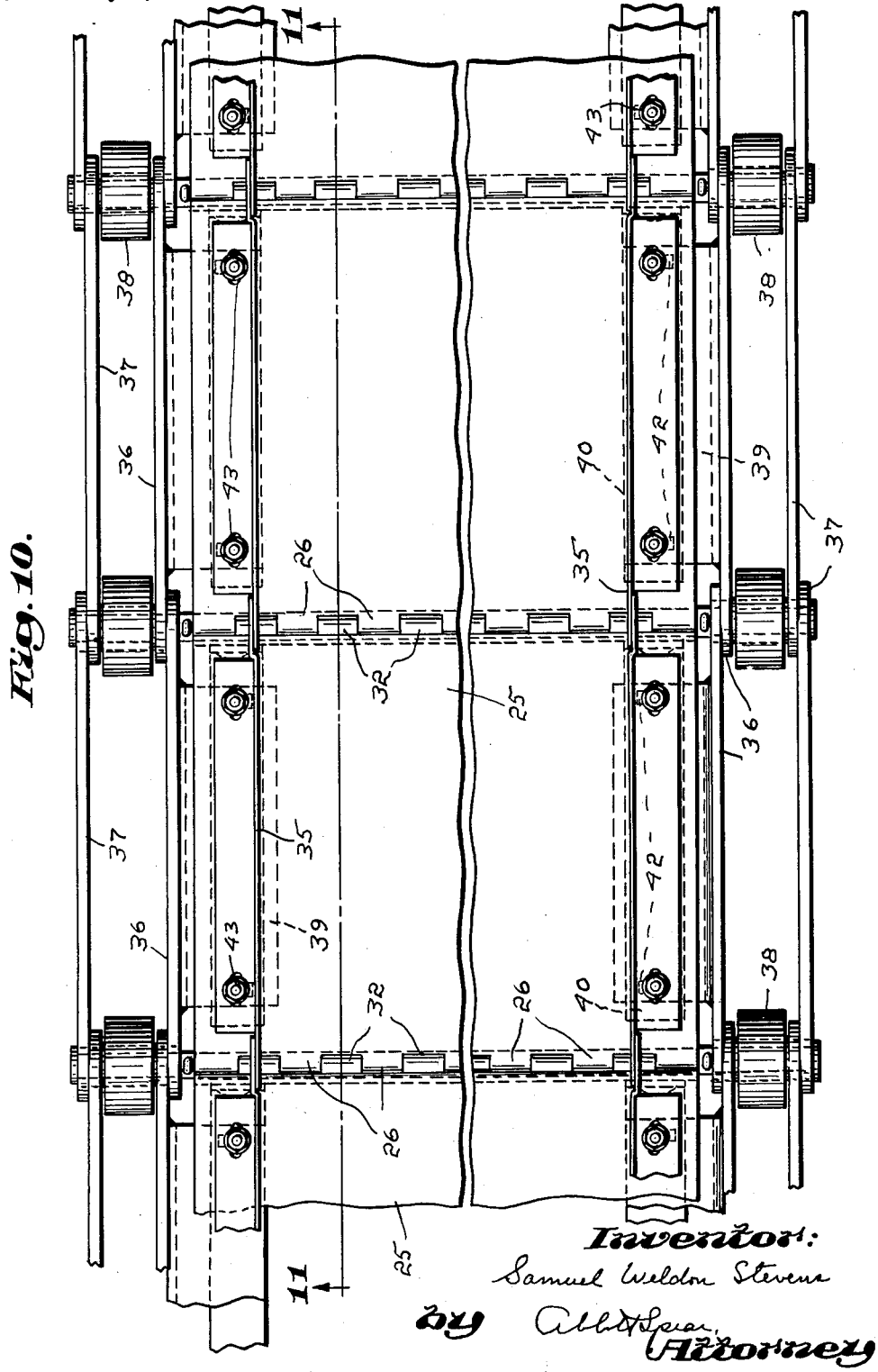

March 3, 1964 S. W. STEVENS 3,123,202
SLATTED-TYPE CONVEYOR
Filed July 2, 1959 5 Sheets-Sheet 5
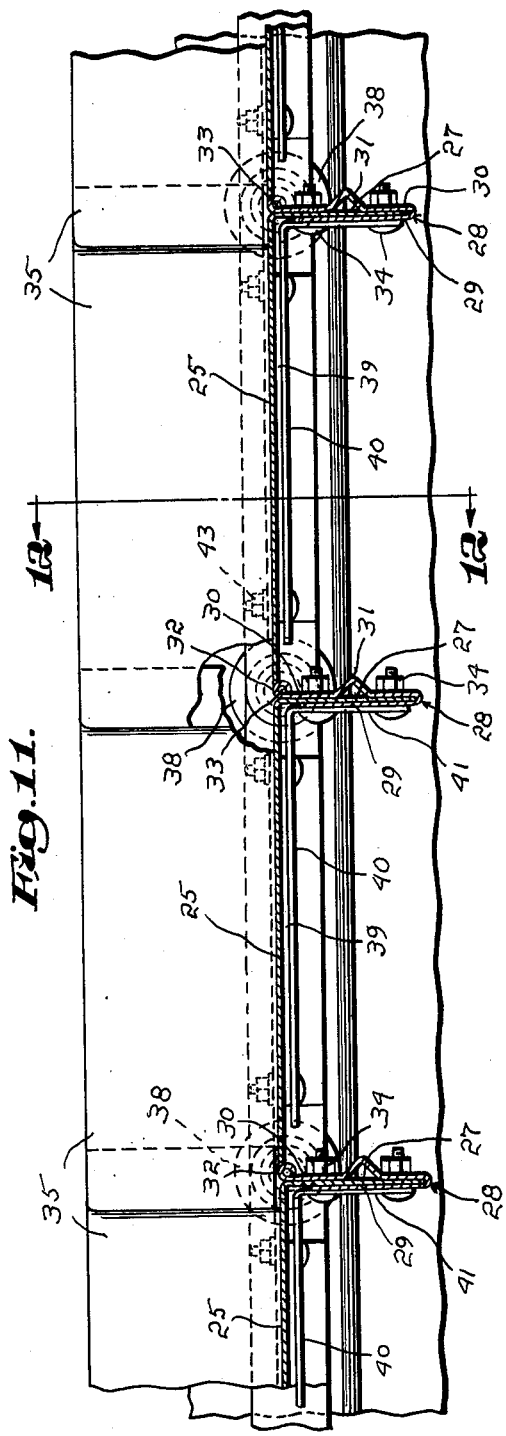
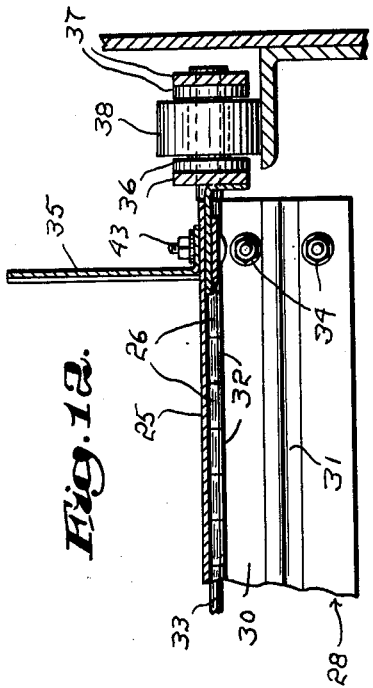
Inventor:
Samuel Weldon Stevens
by Albert Spier,
Attorney United States Patent Office 3,123,202
Patented Mar. 3, 1964

3,123,202
SLATTED-TYPE CONVEYOR
Samuel Weldon Stevens, Lowell, Mass., assignor to C. G. Sargent's Sons Corp., Graniteville, Mass., a corporation of Massachusetts
Filed July 2, 1959, Ser. No. 824,538
8 Claims. (Cl. 198—196)

The present invention relates to conveyors and particularly to the elimination of the problems of conveyor sagging, even in cases of extreme width.

While conveyors in accordance with the invention are adapted for wide range of uses, the problems with which the invention is concerned may be best illustrated by conveyors for driers. For such uses, foraminous flights are usually required for most effective air circulation. The demand for larger driers is limited by the fact that conveyors of appropriate width whose flights are made of such stock, sag to an objectionable extent.

The solving of the problem of conveyor sagging, without limitation as to conveyor width, is the principal objective of the present invention and, in accordance with it, a conveyor is transversely stiffened and longitudinally reinforced by providing special hinges and conveyor sections. The hinges extend from side-to-side of the conveyor and each includes transverse pivot means and at least one inwardly disposed, transverse stiffening member supporting said pivot means and the proximate conveyor section. At least one longitudinally disposed reinforcement for each conveyor section is attached to the proximate stiffening member.

In practice, portions of the stiffening members and of the conveyor sections are clamped together and preferably that of the stiffening members, is in the form of an outwardly opening channel into which an appropriate one of the other portions is entered. It is also preferred that the conveyor section be usually foraminous and sometimes relatively flexible sheets, whose channel entering ends are disposed as inward flanges. Since the conveyor sections are rendered suitably rigid by means of longitudinally disposed and laterally spaced reinforcements, each having at least one end flange clamped to the inwardly disposed portion of the proximate hinge member.

In the accompanying drawings, there are shown illustrative embodiments of the invention from which these and other of its objectives, novel features, and advantages will be readily apparent.

In the drawings:

FIG. 1 is a fragmentary, top plan view of a portion of a conveyor in accordance with the invention;

FIG. 2 is a side view thereof;

FIG. 3 is a section taken approximately along the indicated lines 3—3 of FIG. 1;

FIG. 4 is a fragmentary, top plan view of interconnected conveyor sections in accordance with another embodiment of the invention, FIG. 5 is a side view thereof, FIG. 6 is a section taken approximately along the indicated lines 6—6 of FIG. 4, FIG. 7 is a view, similar to FIGS. 1 and 4, illustrating another embodiment of the invention, FIG. 8 is a side view thereof, FIG. 9 is a section taken approximately along the indicated lines 9—9 of FIG. 7.

FIG. 10 is a fragmentary top plan view of a position of a conveyor in accordance with another embodiment of the invention.

FIG. 11 is a section taken approximately along the indicated lines 11—11 of FIG. 10, and FIG. 12 is a section taken approximately along the indicated lines 12—12 of FIG. 11.

In the embodiment of the invention illustrated by FIGS. 1-3, conveyor sections, generally indicated at 10, are interconected by hinges, generally indicated at 11, and which extend approximately from side-to-side of the conveyor, typically for use in a drier and as much as fourteen feet in width, for example.

Each hinge 11 is shown as having a pair of transverse stiffening members 12 each presenting a narrow flat surface and these are formed with eyes 13 on their proximate edges so spaced that the members 12 may be assembled with the eyes of one located between the eyes of the other for interconnection by a pivot 14. Each stiffening member 12 has an inwardly disposed transverse portion 15 extending from end-to-end thereof and in the form of a narrow, deep, outwardly opening channel. The portions 15 of each hinge 11 are inclined away from each other and the proximate channel walls of proximate hinges terminate short of the plane of the members 12.

For conveyor section 10 is shown as consisting of a foraminous sheet 16 in the form of screening having its ends disposed as flanges 17 extending into the channels 15. The sheet 16 is braced, usually at the margins thereof, by longitudinally disposed and laterally spaced, narrow, flat surfaced reinforcements 18 provided with inwardly disposed end flanges 19 inclined towards each other for face-to-face engagement with the proximate walls of the proximate hinge channels 15 to which they and the sheet flanges 17 are clamped as by bolts 20.

In the embodiment of the invention shown in FIGS. 4-6, conveyor sections 21 are joined by the hinges 11. Each conveyor section 21 is of perforated sheet metal of a gauge that renders it stiff enough to prevent objectionable sagging when formed with end flanges 22, and these are clamped to and preferably located within the proximate hinge channels 15.

Where it is desired to reinforce a sheet of screen stock, such as the sheet 16, between the margins thereof and with minimum interference with air circulation resulting from the reinforcement thereof, reinforcements such as the reinforcement 23 shown in FIGS. 7-9 may be used. The reinforcement 23 is shown as of thin, flat stock disposed edgewise relative to the sheet 16 and provided with end flanges 24 clamped to the proximate walls of the hinge channels 15.

In the embodiment of the invention illustrated by FIGS. 10-12, each of the conveyor sections 25, which may be foraminous, is shown as having a series of eyes 26 spaced along its rear edge and its front edge inwardly disposed to establish a flange 27. A transverse stiffening member, generally indicated at 28, is located between each two sections 25 and is shown as being in the form of a narrow transverse channel whose wall 29 is shorter than its wall 30. The wall 30 has a transverse stiffening fold 31 and, at its free edge, there are a series of eyes 32 spaced and dimensioned to enable each stiffening member 28 and a conveyor section 25 to be assembled with their eyes alternating and in alinement to receive the pivot 33. The flange 27 of another section 25 is entrant of the channel of the stiffening member 28 and is clamped between its walls 29 and 30 as by bolts 34. Each conveyor section 25 is shown as having marginal walls 35.

Each pivot 33 protrudes laterally to the conveyor sections and is connected to the next leading pivot 33 and the next trailing pivot 33 usually by inside and outside links 36 and 37 respectively. It will be noted that the interconnected links are offset and between the interconnected inside links 36 and the interconnected outside links 37 there are rollers 38.

Welded to each inside link 36 and extending under the adjacent margin of each conveyor section 25 is a shelf 39. A longitudinal reinforcement 40 for each shelf has an inturned flange 41 clamped to the stiffening member 28 by the bolts 34. The reinforcement 40 has transverse slots 42 which enable the shelves 39 to be of the same width and connected thereto as by bolts 43 even though the inside link 36 is spaced further from or nearer to the reinforcement than the links 36 at each end of that conveyor section 25.

It will thus be apparent that the invention is well adapted to eliminate objectionable sagging from a wide range of conveyor constructions.

What I therefore claim and desire to secure by Letters Patent is:

1. A conveyor comprising a plurality of hinges extending from side-to-side of the conveyor, each hinge including transverse stiffening members and transverse pivot means interconnecting said members, each stiffening member being provided with a transverse, inwardly disposed portion, and a plurality of conveyor sections, each between a pair of hinges and including ends disposed as flanges, a series of longitudinally disposed and laterally spaced reinforcements, each including a flange at its end, said section and reinforcement flanges being clamped to the proximate transverse, inwardly disposed portion.

2. A conveyor comprising a plurality of hinges extending from side-to-side of the conveyor, each hinge including transverse stiffening members and transverse pivot means interconnecting said members, each stiffening member being provided with a transverse, inwardly disposed, outwardly opening, channel portion, and a plurality of conveyor sections, each between a pair of hinges and including a foraminous, flexible sheet whose ends are disposed as flanges each entrant of the proximate channel portions, a series of longitudinally disposed and laterally spaced reinforcements, each including a flange at its end in engagement with the proximate wall of a channel portion, said sheet and reinforcement flanges and the proximate channel portion being clamped together.

3. A conveyor comprising a plurality of hinges extending from side-to-side of the conveyor, each hinge including transverse stiffening members and transverse pivot means interconnecting said members, each stiffening member being provided with a transverse, inwardly disposed, outwardly opening channel portion, and a plurality of conveyor sections, each between a pair of hinges and including a foraminous, flexible sheet whose ends are disposed as flanges each entrant of the proximate channel portions, a series of longitudinally disposed and laterally spaced reinforcements, in the form of a flat strip each including a flange at its ends in engagement with the proximate wall of a channel portion, said sheet and reinforcement flanges and the proximate channel portion being clamped together.

4. A conveyor comprising a plurality of hinges extending from side-to-side of the conveyor, each hinge including transverse stiffening members and transverse pivot means interconnecting said members, each stiffening member being provided with a transverse, inwardly disposed, outwardly opening channel portion, and a plurality of conveyor sections, each between a pair of hinges and including a foraminous, flexible sheet whose ends are disposed as flanges, each entrant of the proximate channel portion, a series of longitudinally disposed and laterally spaced reinforcements in the form of strips disposed edgewise to the sheet, each including a flange at its ends, said sheet and reinforcement flanges and the proximate channel portion being clamped together.

5. A conveyor comprising a plurality of hinges extending from side-to-side of the conveyor, each hinge including transverse, flat surfaced, stiffening members, and transverse pivot means interconnecting said members, each stiffening member being provided with a transverse, inwardly disposed, outwardly opening channel portion, and a plurality of conveyor sections, each between a pair of hinges and including a foraminous, flexible sheet whose ends are disposed as flanges, each entrant of the proximate channel portion, a series, of longitudinally disposed and laterally spaced reinforcements, each including a flange at its ends in engagement with the proximate wall of a channel portion, said sheet and reinforcement flanges and the proximate channel portion being clamped together with the section being co-planar with the associated stiffening members.

6. A conveyor comprising a plurality of hinges extending from side-to-side of the conveyor, each hinge including transverse, flat surfaced, stiffening members and transverse pivot means interconnecting said members, each stiffening member being provided with a transverse, inwardly disposed, outwardly opening, channel portion inclined away from its pivot means, and a plurality of conveyor sections, each between a pair of hinges and including a foraminous, flexible sheet whose ends are disposed as flanges, each entrant of the proximate channel portion, a series of longitudinally disposed and laterally spaced reinforcements, each including a flange at its ends inclined for mating engagement with the proximate wall of a channel portion, said sheet and reinforcement flanges and the proximate channel portion being clamped together with the section being co-planar with the associated stiffening members.

7. A conveyor comprising a plurality of conveyor sections, a plurality of hinge connections, one hinge connection between each two conveyor sections, each hinge connection including a pivot and at least one transverse, flat member provided with pivot receiving portions along one edge and an inwardly disposed and outwardly opening channel along the other edge thereof, the proximate end of the conveyor section proximate to said channel being inwardly disposed and entrant of and clamped in said channel with said flat member and said proximate section being approximately co-planar.

8. A conveyor comprising a plurality of conveyor sections, a plurality of hinge connections, extending from side-to-side of the conveyor, one hinge connection between each two conveyor sections, each hinge connection including a pivot and at least one transverse member provided with pivot receiving portions along one edge and an inwardly disposed and outwardly opening channel along the other edge thereof, the proximate end of the conveyor section proximate to said channel being disposed as an inwardly disposed flange entrant of said channel, and a series of longitudinally disposed and laterally spaced reinforcements, each including an end flange, said section and reinforcement flanges being clamped to said channel.

References Cited in the file of this patent

UNITED STATES PATENTS

| | | |
|---|---|---|
| 1,800,432 | Buck | Apr. 14, 1931 |
| 1,873,865 | Allsop | Aug. 23, 1932 |
| 2,215,418 | Belcher | Sept. 17, 1940 |